(12) United States Patent
Wellons et al.

(10) Patent No.: US 7,318,046 B1
(45) Date of Patent: Jan. 8, 2008

(54) COLLECTOR'S ACCOUNT PAYMENT PROMISE OPTION ADVISORY APPARATUS AND METHOD

(75) Inventors: Randall S. Wellons, Washington, DC (US); Stacy Roach, Fairfax, VA (US); Jame Cofran, Annapolis, MD (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/356,048

(22) Filed: Jul. 16, 1999

Related U.S. Application Data

(60) Provisional application No. 60/076,910, filed on Mar. 5, 1998.

(51) Int. Cl.
G06Q 40/00 (2006.01)
(52) U.S. Cl. ...................................................... 705/38
(58) Field of Classification Search ................ 705/30, 705/35, 38; 186/37
See application file for complete search history.

(56) References Cited

U.S. PATENT DOCUMENTS

| | | | |
|---|---|---|---|
| 4,736,294 A | 4/1988 | Gill et al. ................... 364/408 |
| 4,774,664 A * | 9/1988 | Campbell et al. | |
| 5,025,138 A | 6/1991 | Cuervo ........................ 235/379 |
| 5,083,270 A | 1/1992 | Gross et al. ................ 364/408 |
| 5,111,395 A * | 5/1992 | Smith et al. .................... 705/45 |
| 5,262,941 A | 11/1993 | Saladin et al. .............. 364/408 |
| 5,341,412 A | 8/1994 | Ramot et al. ................. 379/92 |
| 5,436,965 A | 7/1995 | Grossman et al. .......... 379/266 |
| 5,499,291 A | 3/1996 | Kepley ........................ 379/265 |
| 5,550,734 A | 8/1996 | Tarter et al. ................. 364/401 |
| 5,561,711 A | 10/1996 | Muller ........................ 379/266 |
| 5,592,590 A * | 1/1997 | Jolly ............................ 706/59 |
| 5,621,790 A | 4/1997 | Grossman et al. .......... 379/266 |
| 5,644,633 A | 7/1997 | Kaufeld et al. ............. 379/355 |
| 5,644,726 A | 7/1997 | Oppenheimer .............. 395/238 |
| 5,644,727 A | 7/1997 | Atkins ........................ 395/240 |

(Continued)

FOREIGN PATENT DOCUMENTS

EP 0 806 858 A2 11/1997

(Continued)

OTHER PUBLICATIONS

CACS Enterprise, 8 pages, printed Nov. 19, 2001, including "CACS enterprise 7.1" (4 pages) and "Collections Soultion", 2 pages, AMS, date unknown.*

(Continued)

*Primary Examiner*—Andrew Joseph Rudy
(74) *Attorney, Agent, or Firm*—Staas & Halsey LLP

(57) ABSTRACT

A computer-based promise option advisory module included in a promise management system receives account data, customer data, and parameter data from a database or a collection system, and calculates and displays promise options, or interfaces to a decision engine which calculates the promise options. A user may accept the displayed promise options or input the user's own promise options, in which case the user's promise options are transmitted by the promise management system to the collections system for verification. The calculated promise options include a minimum payment amount and a maximum payment date, and correspond to a single promise, a two part promise, a long term promise, or a deferred payment arrangement promise.

11 Claims, 16 Drawing Sheets

U.S. PATENT DOCUMENTS

| | | | |
|---|---|---|---|
| 5,689,650 A | 11/1997 | McClelland et al. | 395/236 |
| 5,704,044 A | 12/1997 | Tarter et al. | 395/204 |
| 5,761,441 A | 6/1998 | Bennett | 395/235 |
| 5,765,144 A | 6/1998 | Larche et al. | 705/38 |
| 5,784,452 A | 7/1998 | Carney | 379/265 |
| 5,802,161 A | 9/1998 | Svoronos et al. | 379/216 |
| 5,819,230 A | 10/1998 | Christie et al. | 705/4 |
| 5,839,118 A | 11/1998 | Ryan et al. | 705/36 |
| 5,870,720 A | 2/1999 | Chusid et al. | 705/38 |
| 5,875,437 A | 2/1999 | Atkins | 705/40 |
| 5,878,404 A | 3/1999 | Stout, Jr. et al. | 705/38 |
| 5,889,799 A | 3/1999 | Grossman et al. | 379/266 |
| 5,903,879 A | 5/1999 | Mitchell | 705/38 |
| 5,920,848 A * | 7/1999 | Schutzer et al. | 705/42 |
| 5,930,775 A * | 7/1999 | McCauley et al. | 705/36 R |
| 5,950,175 A * | 9/1999 | Austin | 705/38 |
| 5,966,693 A | 10/1999 | Burgess | 705/4 |
| 5,966,700 A | 10/1999 | Gould et al. | 705/38 |
| 5,978,780 A | 11/1999 | Watson | 705/40 |
| 5,991,733 A * | 11/1999 | Aleia et al. | 705/8 |
| 6,006,207 A | 12/1999 | Mumick et al. | 705/38 |
| 6,016,482 A | 1/2000 | Molinari et al. | 705/35 |
| 6,044,355 A | 3/2000 | Crockett et al. | 750/8 |
| 6,067,533 A * | 5/2000 | McCauley et al. | 705/38 |
| 6,073,104 A | 6/2000 | Field | 705/1 |
| 6,088,686 A * | 7/2000 | Walker et al. | 705/38 |
| 6,098,052 A | 8/2000 | Kosiba et al. | 705/40 |
| 6,154,732 A * | 11/2000 | Tarbox | 705/36 |
| 6,311,166 B1 * | 10/2001 | Nado et al. | 705/30 |
| 6,321,206 B1 | 11/2001 | Honarvar | |
| 6,336,104 B1 * | 1/2002 | Walker et al. | 705/38 |
| 6,405,173 B1 | 6/2002 | Honarvar et al. | |
| 6,430,545 B1 | 8/2002 | Honarvar et al. | |
| 6,513,018 B1 * | 1/2003 | Culhane | |
| 6,546,545 B1 * | 4/2003 | Honarvar et al. | |
| 7,024,384 B2 * | 4/2006 | Daughtery, III | 705/36 R |

FOREIGN PATENT DOCUMENTS

| | | |
|---|---|---|
| EP | 0 825 544 A1 | 2/1998 |
| EP | 0 838 063 B1 | 4/1998 |
| EP | 0 949 793 A1 | 10/1999 |
| EP | 0 949 794 A1 | 10/1999 |
| WO | WO 99/33010 | 7/1999 |
| WO | WO 99/59084 | 11/1999 |
| WO | WO 00/11574 | 3/2000 |
| WO | WO 00/28445 | 5/2000 |
| WO | WO 00/33226 | 6/2000 |
| WO | WO 00/34889 | 6/2000 |
| WO | WO 00/49552 | 8/2000 |
| WO | WO 00/54186 | 9/2000 |
| WO | WO 00/54199 | 9/2000 |
| WO | WO 00/60487 | 10/2000 |
| WO | WO 00/62209 | 10/2000 |
| WO | WO 00/62219 | 10/2000 |
| WO | WO 00/65502 | 11/2000 |
| WO | WO 00/65508 | 11/2000 |
| WO | WO 01/04810 A1 | 1/2001 |

OTHER PUBLICATIONS

New York Amsterdam News, New York, N.Y., College grads have 6 months to weigh loan repayments plans, Jun. 21, 1997, 3 pgs.*
CACSTelecom Product Profile (pp. 1-24), dated Jul. 1998 by AMS, (attorney for applicants is advised that the electronic date is Aug. 11, 1998); present specification, p. 4, at lines 7-9 refers to a date of Sep. 1998.
CACS Enterprise Product Profile (pp. 1-30), by AMS, (attorney for applicants is advised that the electronic date is Aug. 1998); present specification, p. 3, at lines 20 and 21 refers to date of Mar. 1998.
CACSPlus Product Profile, Computer Assisted Collection System for Government, Client/Server Version (pp. 1-28), by AMS, (attorney for applicants is advised that the electronic date is Sep. 1997); present specification, p. 4, at lines 5-7 refers to date of Aug. 1997.
"Is Relationship-Based Collection Scoring for You?," Decision Framework, DF-09-7810, M. Knox, Research Notes, Nov. 30, 1999, 2 pages, Gartner Group RAS Services.
U.S. Appl. No. 09/216,985, filed Dec. 21, 1998, Honarvar, American Management Systems, Inc.
U.S. Appl. No. 09/219,340, filed Dec. 23, 1998, Honarvar, American Management Systems, Inc.
U.S. Appl. No. 09/219,338, filed Dec. 23, 1998, Honarvar, American Management Systems, Inc.
U.S. Appl. No. 09/219,341, filed Dec. 23, 1998, Honarvar, American Management Systems, Inc.
U.S. Appl. No. 60/076,910, filed Mar. 5, 1998, Honarvar.
CACS® Enterprise Product Profile, Mar. 1998 by AMS, table of contents and pp. 1-28.
CACSPlus® Product Profile (Client/Server version) by AMS, Aug. 1997, pp. 1-32.
CACS®-Telecom Product Profile by AMS™, Sep. 1998, 4 pages.
Customer Based Collections, by Aidan Wallis, AMS, Jun. 1997, AMS 1997 Finance Industry Conference, pp. 1-34.

* cited by examiner

COLLECTION CYCLE-PAYMENT PROMISE

FIG. 2
(PRIOR ART)
CACS® ENTERPRISE COLLECTION DISPLAY

```
    ********1********2********3********4********5********6********7********8
 1  ZWIN        F017           CACS WINDOWS      MIKE     04/30/92   12:05
 2  101112 0202              NFN F03    DSP PRI  NEXT 0202
 3
 4         DEMOGRAPHIC         I I      AUTOMATED COLLECTION ADVISOR
 5             AREA            I I              USER-DEFINED
 6                             I I           SITUATION SUMMARY - 34
 7              32             I I
 8                             I I
 9                             I I   BAID MEMO BAID MEMO BAID MEMO USER MM/DD/YY
10  ****************************************************************************
11
12
13                                  VIEW AREA - 36
14
15
16
17  ********************************************************************* ## OF ##
18  FLASH MEMO LINE_____
19     LTR/PMT   DATE   TIME AC P C RTE  PROMISE 1    PROMISE 2    EX T COLL BALANCE
20              04/30/97 1040 _ _ _ _                              MIKE     627
21       38     04/30/97 0225 BP    F03                                     627
22          50  04/24/97 0230 PY    F05                                     627
23              04/16/97 1230 OC H A F05    100 04/27            G * MIKE   677
24  1-MORE 2-MEN 3-OFF 10-NXT 11-LKU 13-MAP 14-DM 17-S/WK 18-S/DM 19-S/BWD 20-S/VW
    ********1********2********3********4********5********6********7********8
```

Incoming Call

| Place of contact: | Party contacted: | Disputed amount: |
|---|---|---|
| 42-2 ▽ | 42-1 ▽ | 42-5 |

| Route to state: | Hold date: | Excuse: | Time: |
|---|---|---|---|
| 42-3 ▽ | 42-6 | 42-4 ▽ | 3:00 PM |

42 — right side label
44-1, 42-7

44 { Promise | Correspondence | History text

Promise Advisor

| Min promise amount | Delinquent amount: | Balance on amount: |
|---|---|---|
| $ 100.00  46-1 | $ 105.00  46-3 | $ 1205.00 |

| Max promise date | Current amount due: | Overlimit amount: |
|---|---|---|
| Aug. 25, 1998  46-2 | $ 205.00  46-4 | $ 205.00 |

46-6    46-5

| Rec. promise amount 1 | Rec. promise date 1 |
|---|---|
| $ 205.00  46-7 | Aug. 25, 1998  46-8 |

46

Promise Type — 48

48-1 ● Single    ○ Two Part    ○ Long Term    ○ Deferred
              48-2           48-3           48-4

Promise 1 Detail — 50

| Promise amount: | Promise date: | 50-1 |
|---|---|---|
| 50-1A | 50-1B | |

40

[ Submit Action & Get Next ] [ Submit Action ] [ Cancel ]

Incoming Call

- Place of contact: 42-2
- Party contacted: 42-1
- Disputed amount: 42-5
- Route to state: 42-3
- Hold date: 42-6
- Excuse: 42-4
- Time: 3:00 PM Tabs: Promise | Correspondence | History text

Promise Advisor
- Min promise amount: $ 100.00 (46-1)
- Delinquent amount: $ 105.00 (46-3)
- Balance on amount: $ 1205.00 (46-5)
- Max promise date: Aug. 25, 1998 (46-2)
- Current amount due: $ 205.00 (46-4)
- Overlimit amount: $ 205.00 (46-6)
- Rec. promise amount 1: Aug. 25, 1998 (46-7)
- Rec. promise date 1: $ 205.00 (46-8)
- Rec. promise amount 2: Aug. 25, 1998 (46-9)
- Rec. promise date 2: $ 205.00 (46-10)

Promise Type
- ○ Single (48-1)
- ● Two Part (48-2)
- ○ Long Term (48-3)
- ○ Deferred (48-4)

Promise 1 Detail (50-1)
- Promise amount: 50-1A
- Promise date: 50-1B

Promise 2 Detail (50-2)
- Promise amount: 50-2A
- Promise date: 50-2B

[Submit Action & Get Next] [Submit Action] [Cancel]

FIG. 3C

Incoming Call

| Place of contact: | Party contacted: | Disputed amount: |
|---|---|---|
| 42-2 ▽ | 42-1 ▽ | 42-5 |

| Route to state: | Hold date: | Excuse: | Time: |
|---|---|---|---|
| 42-3 ▽ | 42-6 | 42-4 ▽ | 3:00 PM |

— 42
— 42-7

44 { Promise | Correspondence | History text
44-1

Promise Advisor

| Min promise amount | Delinquent amount: | Balance on amount: |
|---|---|---|
| $ 100.00  46-1 | $ 105.00  46-3 | $ 1205.00 |

| Max promise date  46-2 | Current amount due: | Overlimit amount: |
|---|---|---|
| Aug. 25, 1998 | $ 205.00  46-4 | $ 205.00 |

46-6   46-5

| Rec. promise amount 1 | Rec. promise date 1 | |
|---|---|---|
| Aug. 25, 1998  46-7 | $ 205.00  46-8 | 46-13 |

| Rec. LT pmt amount | Rec. frequency  46-12 | Rec. day |
|---|---|---|
| $ 125.00  46-11 | Monthly | 5 |

— 46

Promise Type — 48

48-1 ○ Single     ○ Two Part     ● Long Term     ○ Deferred
                      48-2            48-3              48-4

Promise 1 Detail

| Promise amount: | Promise date: | 50-1 |
|---|---|---|
| 50-1A | 50-1B | |

Long Term Promise                                                50-3

| Promise Amount | Frequency: | Day: |
|---|---|---|
| 50-3A | 50-3B ▽ | 50-3C |

— 50

[ Submit Action & Get Next ] [ Submit Action ] [ Cancel ]
                            52

Incoming Call

Place of contact: 42-2
Party contacted: 42-1
Disputed amount: 42-5
Route to state: 42-3
Hold date: 42-6
Excuse: 42-4
Time: 3:00 PM Tabs: Promise | Correspondence | History text

Promise Advisor
- Min promise amount: $ 100.00
- Delinquent amount: $ 105.00
- Balance on amount: $ 1205.00
- Max promise date: Aug. 25, 1998
- Current amount due: $ 205.00
- Overlimit amount: $ 205.00
- Rec. promise amount 1: Aug. 25, 1998
- Rec. promise date 1: $ 205.00
- Rec. DPA pmt. amount: $ 125.00
- Rec. frequency: Monthly
- Rec. # of payments: 5

Promise Type
○ Single  ○ Two Part  ○ Long Term  ● Deferred

Down Payment Information
Amount: 50-4A
Date: 50-4B

Deferred Payment Arrangement
Promise Amount: 50-5A
Frequency: 50-5C
# of pmts: 50-5B
Total amount: 50-5D
Day: 50-5E
[CALCULATE]

[Submit Action & Get Next] [Submit Action] [Cancel]

Party Contacted          42-1

Attorney
　Secondary
　Accountholder
　Other
　Left message to call
　Disconnected
　Accountant / Bookkeeper
　No answer
　Spouse
　Busy
　Accountholder
　No longer employed here

Figure 4A

Place of Contact          42-2

Secondary / Joint Home
　Other
　Bank Contact
　Secondary / Joint Business
　Business
　Home
　Information/ Operator

Figure 4B

Route to State                    42-3

This list is customized at each implementation.

A few examples could include:

Waiting Call by Day Collector
Waiting Call by Same Collector
Broken Promise Review
Awaiting Supervisor Review
No Good Check Review

Figure 4C

Excuse Code                       42-4

This list is customized at each implementation.

A few examples could include:

Death in Family
Out of Town
Illness
Lost Job
Working Part-Time

| Promise Option Advisory Field | Definition |
|---|---|
| Minimum Promise Amount (1) | This value is the minimum acceptable promise amount. The minimum promise amount is the greatest of the following three values, or calculations:<br>　1. Minimum acceptable commitment amount from the CACS® parameter table<br>　2. Minimum acceptable commitment percentage (from the CACS® parameter table) multiplied by the Total Delinquent Amount for the customer's account;<br>　3. Minimum acceptable Over Limit percentage (from the CACS® parameter table) multiplied by the Over Limit Amount for the customer's account.<br>Note: In certain instances users may override the minimum acceptable promise amount. |
| Delinquent Amount (2) | The amount of delinquency on the customer's account. Account financial details are sourced from an accounting system. |
| Balance on Account (3) | The outstanding balance on the customer's account. Account financial details are sourced from the accounting system. |
| Maximum Promise Date (4) | The last acceptable date that a customer can commit to make a payment. This is derived by adding the Maximum promise interval days parameter to the current date. The Maximum promise interval days parameter is stored in a collection system such as CACS® or is determined by each financial institution installing the promise option advisory module. |
| Current Amount Due (5) | The current payment amount due on the customer's account. Account financial details are sourced from accounting system. |
| Overlimit Amount (6) | The amount the customer's account is over the credit limit. Account financial details are sourced from accounting system. |
| Recommended Promise Amount 1 (7) | The amount of money that the customer should ideally pay their first promised payment, based upon decision logic. |

Figure 5B

| Promise Option Advisory Field | Definition |
|---|---|
| Recommended Promise Date 1(8) | The date on which the customer should ideally pay their first promised payment, based on decision logic. |
| Recommended Promise Amount 2 (9) | The amount of money that the customer should ideally pay for the second part of the two-part promise, based upon decision logic. |
| Recommended Promise Date 2(10) | The date on which the customer should ideally pay the second part of the two-part promise, based on decision logic. |
| Recommended Long Term Promise Amount (11) | The amount of money that the customer should ideally pay each of the long term promises, based upon decision logic. |
| Recommended Long Term Frequency (12) | The frequency that the customer should ideally pay each of the promises, based upon decision logic. |
| Recommended Long Term Day (13) | The day on which the customer should ideally pay each of the promises, based upon decision logic. |
| Recommended Deferred Payment Arrangement (DPA) Amount (14) | The amount of money that the customer should ideally pay each of the promises, based upon decision logic. |
| Recommended DPA Frequency (15) | The frequency that the customer should ideally pay each of the promises, based upon decision logic. |
| Recommended DPA Number of Payments (16) | The number of payments that the customer should ideally make to bring the account up to date, based on decision logic. |

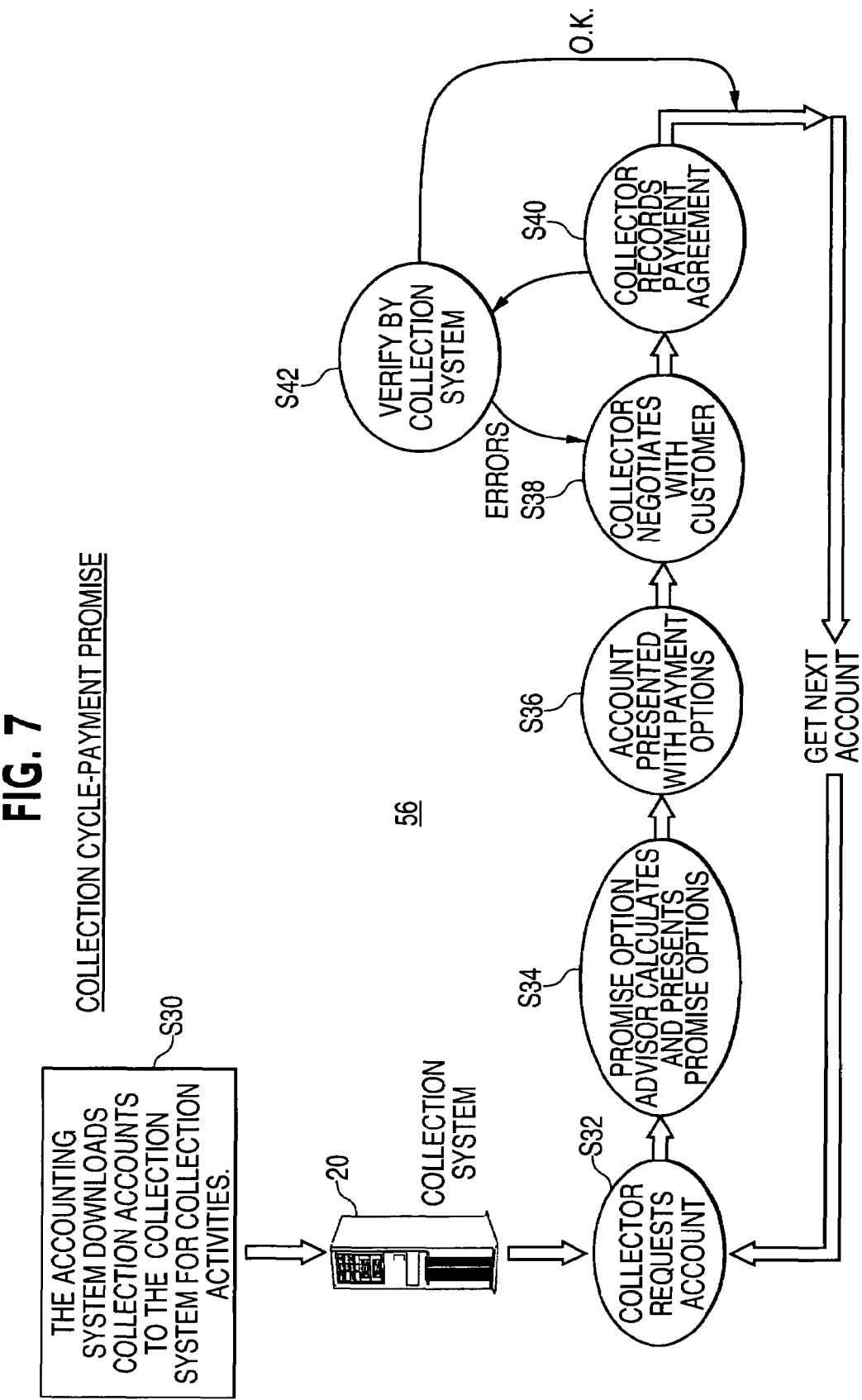

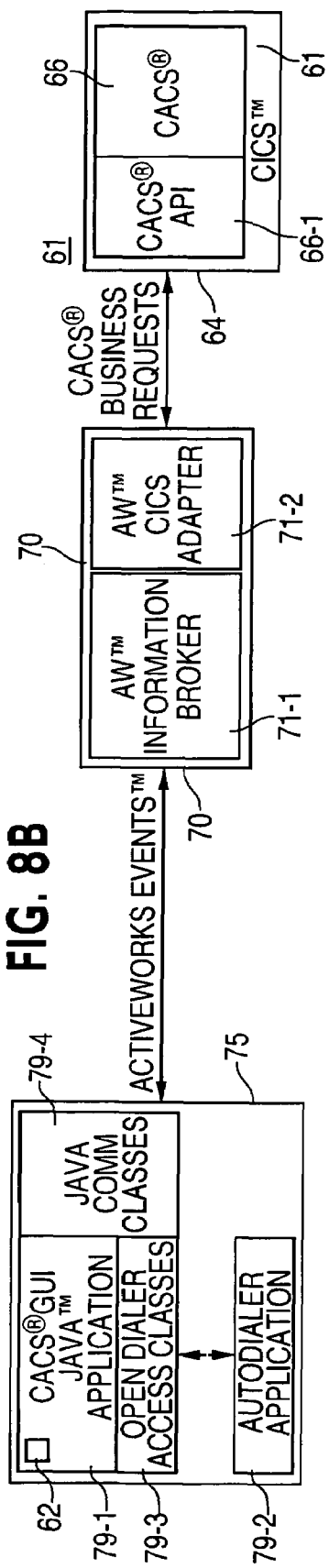

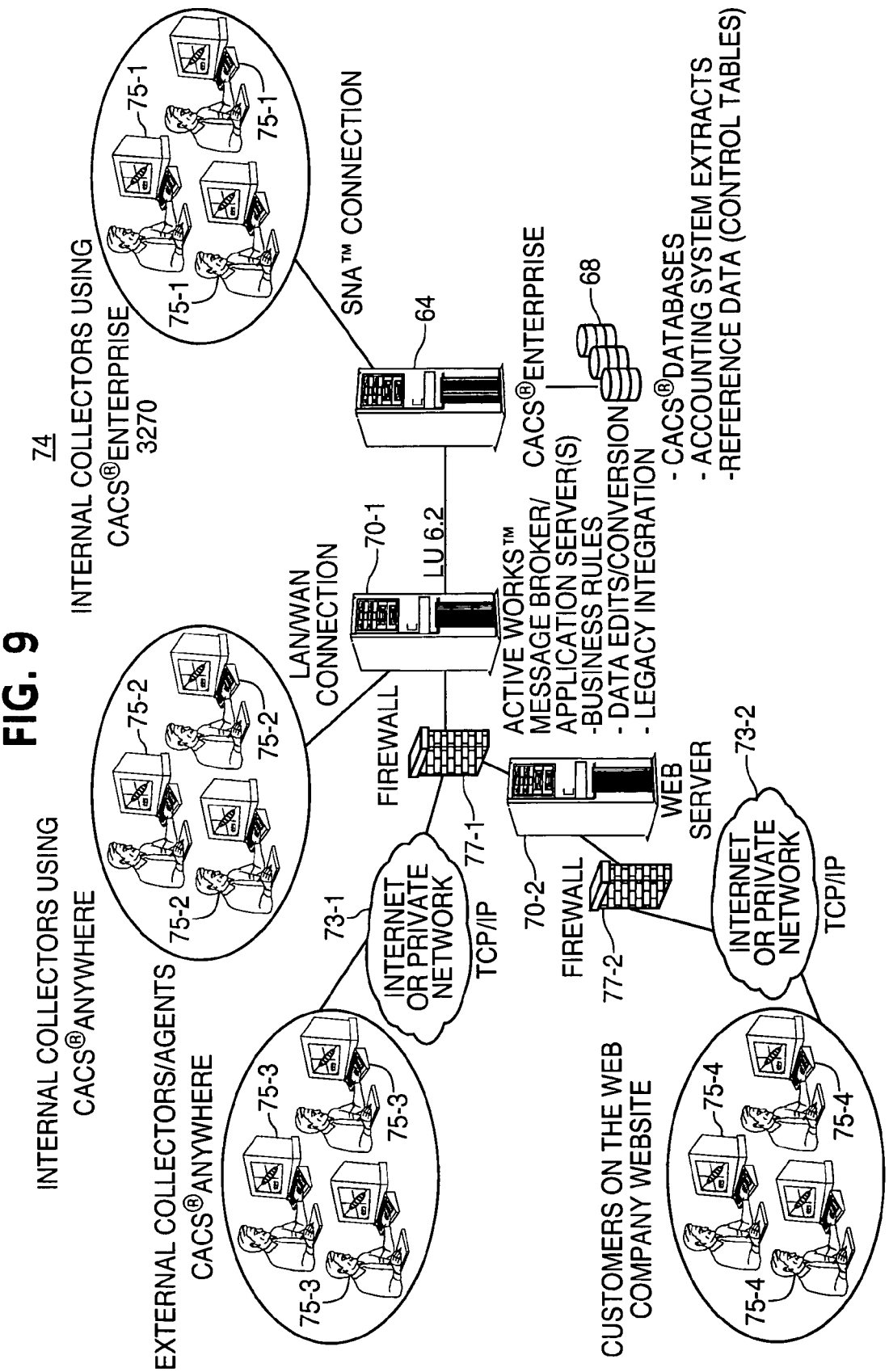

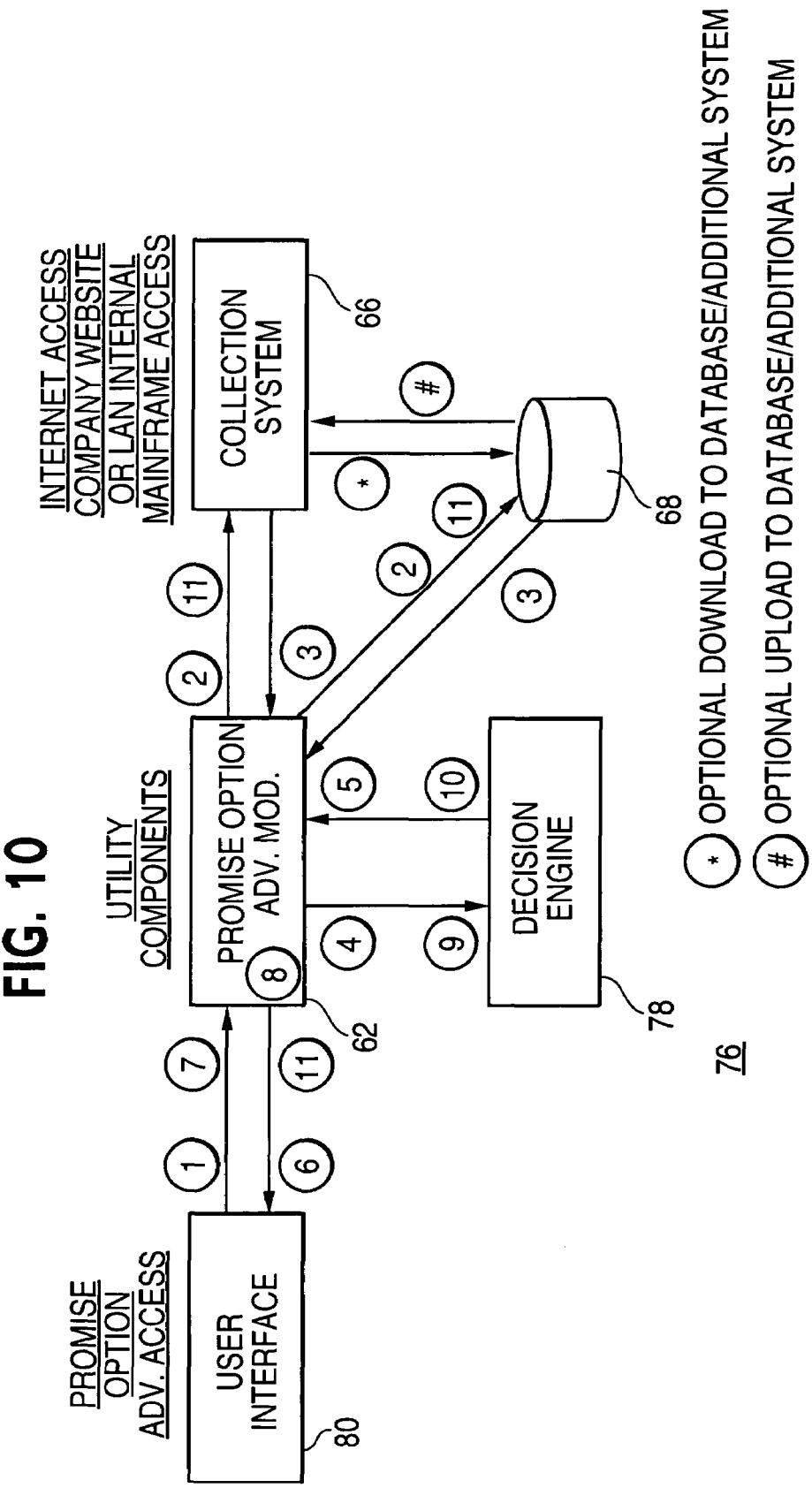

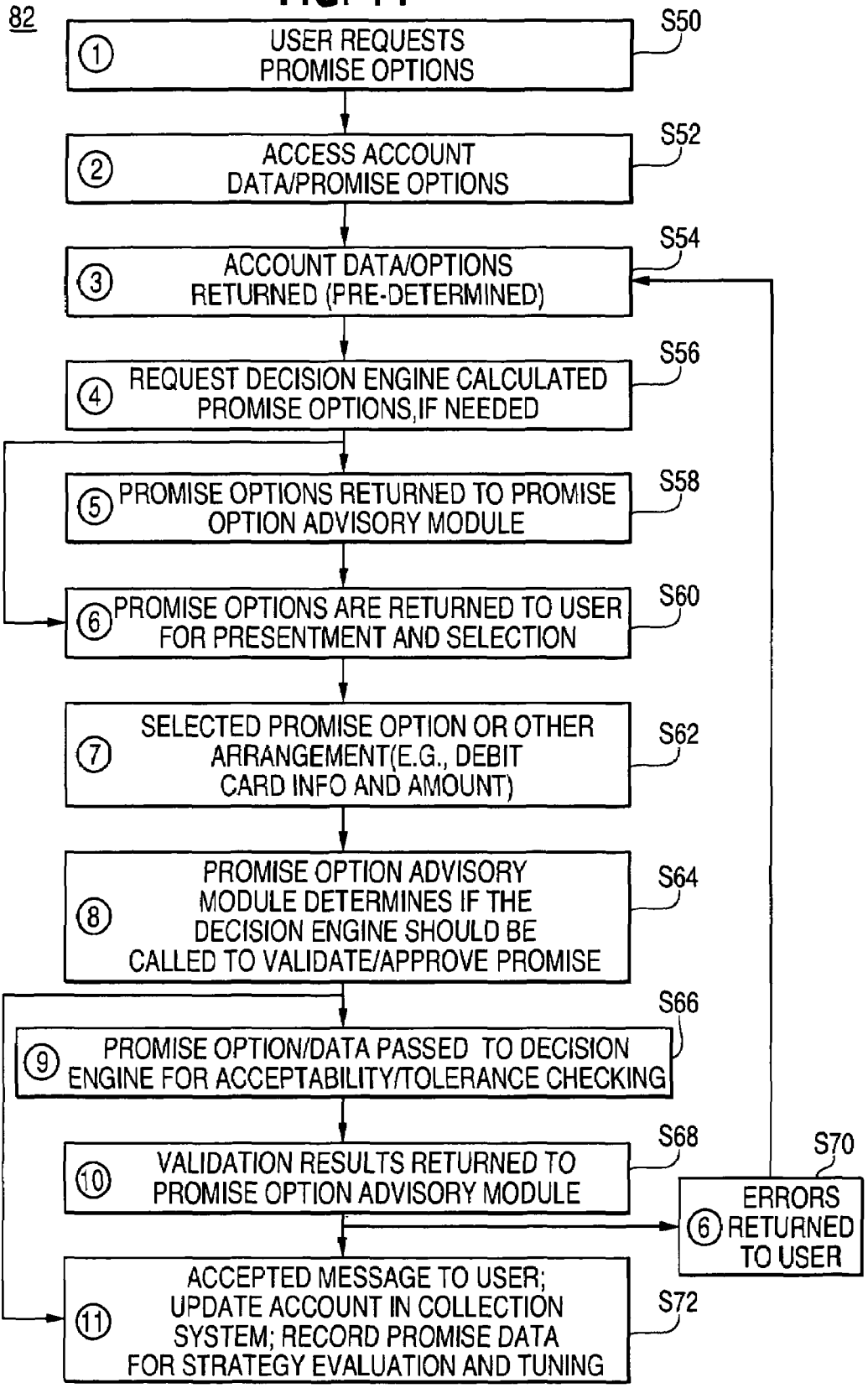

COLLECTOR'S ACCOUNT PAYMENT PROMISE OPTION ADVISORY APPARATUS AND METHOD

CROSS REFERENCE TO RELATED APPLICATIONS

This application is related to provisional application Ser. No. 60/076,910, filed Mar. 5, 1998, and which is incorporated herein by reference.

This application is related to U.S. application titled DECISION MANAGEMENT SYSTEM FOR CREATING STRATEGIES TO CONTROL MOVEMENT OF CLIENTS ACROSS CATEGORIES, U.S. Ser. No. 09/217,017, filed Dec. 21, 1998, now U.S. Pat. No. 6,321,206, issued Nov. 20, 2001, and which is incorporated herein by reference.

This application is related to U.S. application titled SIMULTANEOUS CUSTOMER/ACCOUNT STRATEGY EXECUTION IN A DECISION MANAGEMENT SYSTEM, U.S. Ser. No. 09/216,985, filed Dec. 21, 1998, and which is incorporated herein by reference.

This application is related to U.S. application titled USE OF ONLINE ANALYTICAL PROCESSING (OLAP) IN A RULES BASED DECISION MANAGEMENT SYSTEM, U.S. Ser. No. 09/217,016, filed Dec. 21, 1998, now U.S. Pat. No. 6,430,545, issued Aug. 6, 2002, and which is incorporated herein by reference.

This application is related to U.S. application titled VERSIONING IN A RULES BASED DECISION MANAGEMENT SYSTEM, U.S. Ser. No. 09/219,341, filed Dec. 23, 1998, and which is incorporated herein by reference.

This application is related to U.S. application titled PARAMETER HIERARCHY FOR A DECISION MANAGEMENT SYSTEM, U.S. Ser. No. 09/219,340, filed Dec. 23, 1998, and which is incorporated herein by reference.

This application is related to U.S. application titled DECISION MANAGEMENT SYSTEM WHICH IS CROSS-FUNCTION, CROSS-INDUSTRY AND CROSS-PLATFORM, U.S. Ser. No. 09/219,338, filed Dec. 23, 1998, and which is incorporated herein by reference.

This application is related to U.S. application titled DECISION MANAGEMENT SYSTEM PROVIDING QUALITATIVE ACCOUNT/CUSTOMER ASSESSMENT VIA POINT IN TIME SIMULATION, U.S. Ser. No. 09/258,348, filed Feb. 26, 1999, now U.S. Pat. No. 6,405,173, issued Jun. 11, 2002, which is incorporated herein by reference.

BACKGROUND OF THE INVENTION

1. Field of the Invention

The present invention relates to a computer assisted credit management system including a collection system, a decision engine, and a promise management system, and, more particularly, to a promise management system which interfaces to the decision engine and to the collection system and which recommends payment promise terms to the user of the system.

2. Description of the Related Art

Computer assisted credit management systems, including computer assisted collection systems, are known in the art. Generally, a collection system, such as a full collections system, may include a variety of components, such as a Collection Engine, a Decision Engine, a User Interface (for either a collector or customer), and other components. A collector is a user of a collection system whose primary job is to use a collection system to facilitate collecting payments on accounts needing collection action, such as delinquent accounts, overlimit accounts, special status accounts, etc. Collection systems generally include parameters, such as collection policy parameters. Collection policy parameters are used by credit granting institutions to specify how a collection system implements the collection policy of the credit granting institution.

Examples of computer assisted collection systems include the Computer Assisted Collection System™ (or CACS®), by American Management Systems, Inc. (AMS), and its several versions including CACS® Enterprise, Computer Assisted Collection System™ for Government (including TRACE™), and CACS®-Telecom.

CACS® Enterprise is explained in the CACS® Enterprise Product Profile, March 1998 by AMS, incorporated herein by reference. Prior versions of computer assisted collections systems such as CACS® Enterprise have been in use for many years, with the CACS® Baseline having been in use since approximately 1984, with approximately 200 collections organizations worldwide using various interfaces, such as a CACS® Enterprise 3270 interface, an AS/400™ interface, and PowerBuilder™ (for CACS®-T and CACS®-G).

CACS® Enterprise, such as CACS® Enterprise 7.0, is a member of the AMS series of credit management software that supports all phases of credit operations, from initial application processing through servicing and accounting to collections. Available exclusively through AMS, each system can be installed individually, collectively, or in any combination to address evolving support requirements.

The Computer Assisted Collection System™ for Government is explained in the CACSPlus® Product Profile (Client/Server version) by AMS, August 1997, and incorporated herein by reference. CACS®-Telecom is explained in the CACS®-Telecom Product Profile by AMS™, September 1998, incorporated herein by reference. In addition, there are mainframe versions of CACS®, having a 3270™ interface thereto, such as TRACE™.

Computerized tracking of promises to pay is also known in the art. CACS® Enterprise records promises to pay. More particularly, CACS® Enterprise supports recording of promises on collection accounts. In the computer assisted collection systems of the related art, such as CACS® Enterprise, the user (for example, the collector), provides the system with arrangements of repayment of an outstanding debt, referred to as promises to pay, by the account holder. CACS® Enterprise relies on customer account data and collection parameters entered into the collection system by the system administrator to validate reactively the collector-entered promise terms, including promise amounts, dates, and schedules.

Generally, in the computer assisted collection system of the related art, the arrangements of the promises to pay (such as payment amount and frequency of payment) are negotiated between the collector and the account holder, and are then input into the computer assisted collection system of the related art for verification against criteria previously established and provided therein. If the negotiated arrangements of the promises to pay are not within the criteria provided in the computer assisted collection system, an error message is displayed to the collector indicating that the arrangements are not accepted by the computer assisted collection system. The collector must then re-negotiate the arrangements with the account holder, and enter the re-negotiated arrangements into the computer assisted collection system for verification. The process of negotiation and verification continues until the arrangements of the promises to pay are acceptable to the collector, the account holder, and the computer assisted collection system.

FIG. 1 shows an example of a collection cycle 12 for a payment promise using CACS® Enterprise, as an example using a collection system 20 of the related art. The collection system 20 of the related art may be provided in a mainframe or a client/server environment.

As shown in FIG. 1, in operation S10, an accounting system downloads collection accounts to the collection system 20 of the related art for collection activities. Then, in operation S12, the collector requests of the collection system 20 an account. Based upon the account returned from the collection system, in operation S14, the collector then negotiates with the customer (or account holder) the arrangements of the promise to pay. Next, in operation S16, the collector records in the collection system 20 the payment arrangements (or agreement) reached with the customer. The collection system 20 then verifies whether the payment arrangements meet the criteria provided in the collection system 20, as shown in operation S18. If there are errors in the payment arrangements (i.e., the payment arrangements do not satisfy the collection parameters stored in the collection system), then the part of the collection cycle of the prior art beginning with operation S14 is repeated until there are no errors in the payment arrangements.

In the meantime, control is returned to operation S12 and the next account is obtained by the collector from the collection system.

FIG. 2 shows a screen layout 30 from a current CACS® Enterprise 3270 mainframe display, for a particular account. As shown in FIG. 2, the screen layout 30 includes account holder demographics 32, account summary data 34, account data view and scripts (including information such as the date the account was opened, the credit limit, the date of the last bill, the balance, the amount in dispute, the total amount due currently, the amount that is over the credit limit, the amount that is late, and the aged data) 36, and an account history 38 (including previously-made promises) which includes an area for the collector to interact with the collections system.

Promises in CACS® Enterprise are now discussed. Collectors can make arrangements with account holders for one or two payments (standard promises), or for a series of weekly, bi-weekly, or monthly payments (long-term promises or deferred payment arrangements). Standard and long-term promises, as well as deferred payment arrangements, are described in further detail in the following paragraphs.

Standard Promises

The CACS® Enterprise mainframe screen display includes a Coded Collection History line having fields such as PROMISE 1 and PROMISE 2. Collectors may enter a single promise by filling an amount and date in the PROMISE 1 fields of the Coded Collection History line. Collectors may enter two promises by filling in both the PROMISE 1 and PROMISE 2 fields. CACS® Enterprise validates the promise amount and date entered according to parameters entered in management control tables.

Long-Term Promises

CACS® Enterprise considers any payment arrangement extending for more than two payments as a long-term promise. To enter long-term promises, collectors enter the amount and date of the first payment, along with the amount of the long-term promise amount for the weekly, biweekly or monthly payment.

Deferred Payment Arrangement

A Deferred Payment Arrangement (DPA) is another type of promise CACS® Enterprise supports. Collectors set up a DPA to record a weekly, biweekly, or monthly promise for the current bill plus an agreed-upon monthly payment which is applied to the outstanding delinquency.

In a typical collection system of the related art, delinquent accounts are arranged into groups, then into queues within the groups, in accordance with rule-based criteria. Each collector is provided by the collection system with a next account from a particular queue. For example, CACS® Enterprise divides accounts into groups based upon parameters such as front end parameters, midrange parameters, and other group parameters, which are discussed herein below.

Queues of accounts are also built by CACS®. The queues include accounts requiring the same next action, e.g., send a letter, contact customer for a payment promise. Rules are defined to control the movement of accounts between queues. Queues are defined for special purposes, such as supervisor review. If a collector cannot come to acceptable terms within parameters on a payment promise, the account is routed to a supervisor queue for out-of-tolerance promise approval/denial. Approved payment promises are put into the proper queue to wait for promise fulfillment; denied payment promises are returned to the collector for re-work.

Known in the art are systems which offer recommendations of promises for a particular account using a single account's data. More particularly, known in the art is a promise advising system in which a decisioning component evaluates and recommends suggested payments based on decision trees. Decision trees, or decision engines, are also known in the art.

A concept previously proposed, although not embodied, includes a promise advising process which evaluates and presents recommended payment amounts using account and/or customer data.

A problem with credit management systems, and collection systems in particular, of the related art is that several iterations between the collector and the account holder may be necessary to establish an arrangement of payment acceptable to the collector, the collection system, and the account holder, because the related art collection systems verify payment promises entered by the collector against predetermined criteria as a reactive check. Therefore, reaching agreement between the collector, the collection system, and the account holder is a hit or miss process.

Another problem with credit management systems, and collection systems in particular, of the related art is that payment promise options are not presented to the collector by the collection system prior to negotiations between the collector and the account holder.

Still a further problem with systems of the related art is that recommended best payment options are not offered.

A further problem with credit management systems, particularly with collection systems, of the related art is that a collector must first enter a promise date and amount, and submit same to the collection system for validation of keying errors and collection policy adherence, without knowing whether the promise date and amount adhere to the collection policy provided in the collection system.

SUMMARY OF THE INVENTION

The present invention solves the above-mentioned problems of the collection systems of the related art.

An object of the present invention is to present proactively promise options to a collector.

Another object of the present invention is to remove the guesswork associated with establishing payment promises acceptable to the collector, the collection system, and the account holder.

A further object of the present invention is to establish payment promises which are acceptable to collection policies of an institution before submission of the payment promises to the collection system for verification of adherence to the collection policies.

Still another object of the present invention is to present a recommended best payment option that is in the best interest of the institution and the customer.

Additional objects and advantages of the invention will be set forth in part in the description which follows, and, in part, will be obvious from the description, or may be learned by practice of the invention.

To accomplish the above-mentioned objects, the present invention is computer-based promise option advisory module, provided in a promise management system which interfaces to a collection system, and which speeds up collection account activity processing by proactively recommending to a user appropriate payment promise terms, including a minimum promise amount (of money), a maximum promise date, and a recommended best payment option, available for each customer or account holder. The promise management system of the present invention recommends the payment minimum promise amount and maximum promise date calculated by the promise option advisory module using account data drawn from multiple accounts of the customer, customer data, and collection policy parameters of the credit granting institution. The promise management system of the present invention also may include a decision engine, described herein below, which determines the recommended best payment option, and transmits the recommended best payment option to the promise option advisory module for presentation to the user. The recommended best payment option includes a recommended promise amount and a recommended promise date.

The promise management system of the present invention provides to the user, such as a collector, various payment options, including the recommended payment promise amounts, recommended promise dates, and recommended best payment option, consistent with the collection policy parameters established within a collection system, before the collector negotiates the payment promise amounts and dates with the account holder, thus ensuring that the collector can present to the account holder payment promise amounts and dates consistent with the collection policy parameters.

For example, to record quickly a suggested single promise amount in the promise management system of the present invention, the collector selects the corresponding promise push-buttons on a graphical user interface (GUI) to prefill payment promise amount and date fields with the selected promise amount and promise date provided by the promise management system. The promise management system of the present invention presents as promise options a recommended promise amount and recommended promise date, and a recommended best payment option (including Recommended Promise Amount and Recommended Promise Date), and the collector may select from the above-mentioned promise options to prefill the payment promise amount and payment promise date.

It will be apparent to those of ordinary skill in the art that interfaces other than a GUI interface can also be used in the promise management system of the present invention.

In addition, the promise management system of the present inventions presents the user with corresponding, prefilled payment promises for types of promises other than a single promise, such as two-part promises, long-term promises, and deferred payment arrangements, for recording.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 2 is a diagram of a collection system display screen for a 3270 mainframe display of the related art;

FIGS. 3A, 3B, 3C, and 3D show variations of a promise management screen 30 of the present invention, including promise option advisory group boxes, included in and displayed by the promise management system of the present invention;

FIGS. 4A, 4B, 4C, and 4D show options provided in dropdown lists of the promise management screens shown in FIGS. 3A, 3B, 3C, and 3D;

FIGS. 5A and 5B show promise options and lists of definitions of the promise options executed by the promise option advisory module of the present invention;

FIG. 7 is a flowchart 56 of a collection cycle, including a payment promise, in which the promise management system of the present invention is used;

FIG. 8A is a hardware diagram of a computer system 60 on which the promise option advisory module in the promise management system of the present invention is executed;

FIG. 8B is a software diagram of computer system software 61 including the promise option advisory module 62 in the promise management system of the present invention;

FIG. 9 is a hardware architecture diagram of a network 74 including client personal computers 75 executing promise option advisory module software 62 of the present invention;

FIG. 10 is a data flow diagram showing data flow in a preferred architecture of a computer system 76 implementing the promise option advisory module 62 of the present invention; and FIG. 11 is a flowchart 82, related to, and explaining, the data flow diagram of FIG. 10.

DESCRIPTION OF THE PREFERRED EMBODIMENTS

Figure 1:
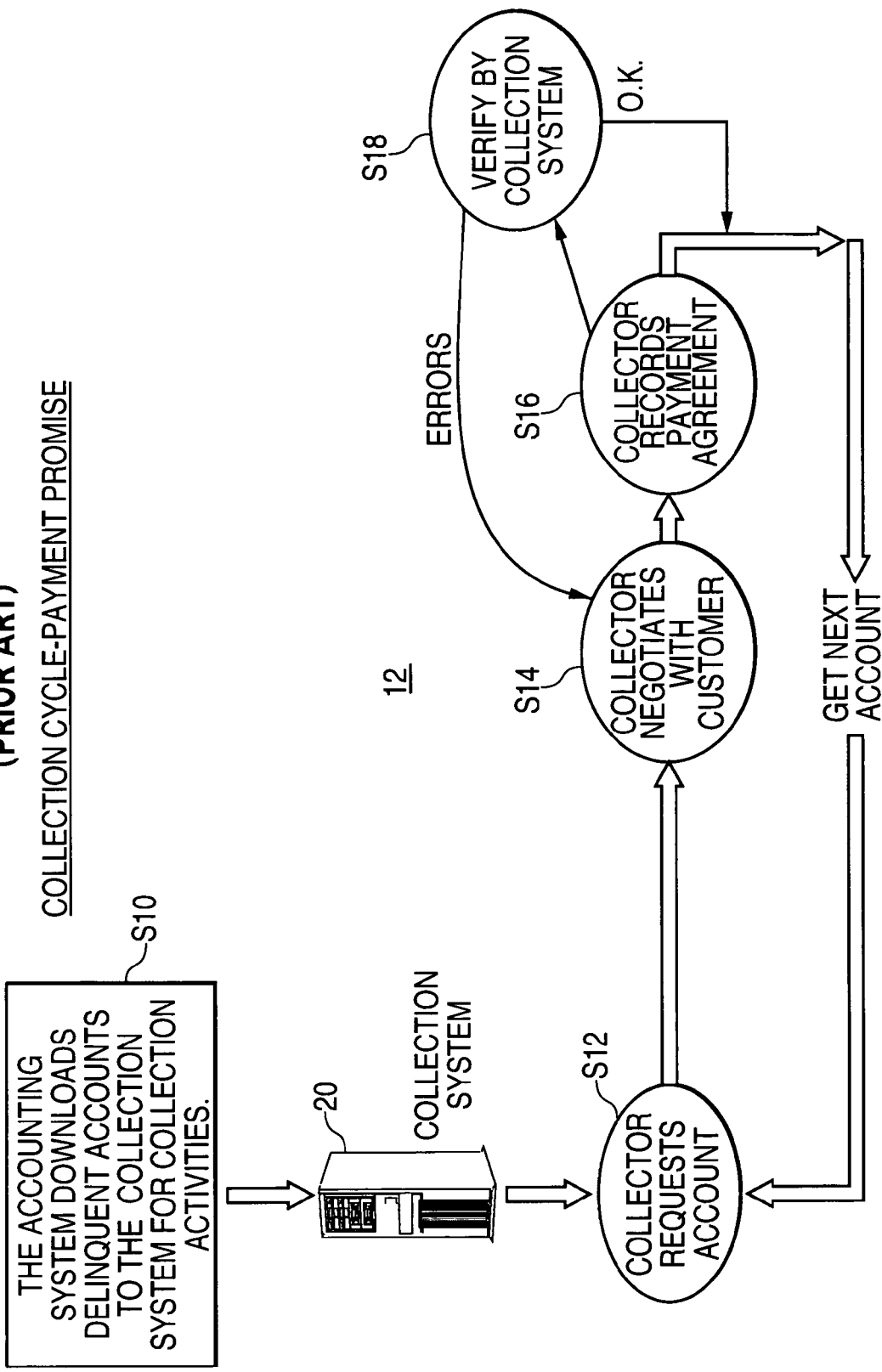
FIG. 1 is a flowchart showing the collection cycle establishing a payment promise using collection systems of the related art.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

A payment promise is a commitment made by an account holder to a collector for payment by the account holder of money owed. The payment promise can include many options, but typically includes an amount of money owed and frequency of payments as two of those options. To speed up negotiating and recording of mutually-agreeable payment promises, the present invention is a computer-based promise management system which proactively calculates, by a promise option advisory software module of the promise management system, available promise options using customer account data and collection parameters entered into the collection system by the system administrator.

The promise management system of the present invention, through the promise option advisory module of the present invention included therein, uses account data, drawn from multiple accounts of the customer, and/or customer data (which is data about the customer relationship (also referred to as relationship-specific information)), to recommend promise options for that customer, as discussed herein below more specifically with reference to FIGS. 5A and 5B. A decision engine coupled to the promise option advisory module of the present invention, prepares and presents to the promise option advisory module of the present invention, a recommended best payment option based upon the relationship-specific information; other promise options are determined by the promise option advisory module of the present invention based upon data stored in a database or a collection system coupled thereto.

Accordingly, in the present invention, account data about a customer is not confined to a single account of the customer, but includes data from the multiple accounts of the customer and the relationship-specific information. Thus, the promise option advisory module of the present invention interfaces to a decision engine (which calculates the recommended best and minimum promise and validates a user-entered promise) and, optionally, to a collection system, to transmit and receive various data, as described herein below.

By proactively recommending valid payment promise terms and a recommended best or minimum payment option, and allowing the collector to record the suggested promise, for example by selecting the suggested promise using a push-button, the promise management system of the present invention reduces the incidence of errors and the overall time required to solicit and record a payment promise that is within credit policy guidelines.

The promise management system of the present invention operates in conjunction with a collection system of the related art and includes a graphical user interface (GUI) which displays a promise management screen, in the form of a promise management action dialog, to the user when the user selects a Promise tab displayed on a collection display screen.

The promise management portion of the action dialog includes several group boxes, described in detail herein below, including a promise option advisory group box which presents to the user predetermined promise options including minimum promise amount, maximum promise date, delinquent amount, current amount due, balance on account, overlimit amount, recommended best promise amount, and recommended best promise date. As described herein below, the minimum promise amount and the maximum promise date are calculated by a promise option advisory module based upon other promise options which are stored in and retrieved from the collection system (or from a separate database accessible by both the collection system and the promise option advisory module of the present invention).

The recommended best promise amount is the amount that the customer should ideally pay based on decision logic, including account data drawn from multiple accounts of the customer, customer data, credit granting institution policy, etc. Likewise, the recommended best promise date is the date on which the customer should ideally pay based on the above-mentioned decision logic.

The users may include a collector, the account holder, or other types of users as will be apparent from the description below. For the purposes of the following discussion with reference to FIGS. 3A, 3B, 3C, and 3D, the user will be referred to as the collector. In addition, the prior art collection system referred to is the CACS® Enterprise system. However, other collection systems may be used in place of, or in conjunction with, the CACS® Enterprise system.

FIGS. 3A, 3B, 3C, and 3D show examples of variations, respectively, of a promise management action dialog 40 of the present invention included in and displayed by the promise management system of the present invention. As explained in further detail herein below, the promise management action dialog 40 includes promise data displayed when a promise tab is selected on the promise management action dialog 40. The promise management action dialog includes promise option advisory group boxes, which may vary depending upon whether a single promise (FIG. 3A), a two-part promise (FIG. 3B), a long-term promise (FIG. 3C), or a deferred promise arrangement (FIG. 3D) is selected in the promise management action dialog.

As shown in FIGS. 3A, 3B, 3C, and 3D, the promise management action dialog 40 is displayed on a computer display 41 when, for example, the collector receives an incoming telephone call and the collector is using a computer system which includes the promise management system of the present invention. The computer display 41 may be part of a standalone personal computer, a personal computer which is part of a client-server network, or a terminal coupled to a mainframe computer.

The promise advisor action dialog is now explained with reference to FIGS. 3A, 3B, 3C, and 3D. The promise option advisory group boxes which are shown in common in FIGS. 3A, 3B, 3C, and 3D are explained with reference to FIG. 3A, and the explanations of same are not repeated for FIGS. 3B, 3C, and 3D. Further, in the following explanations, reference is made to promise options (1) through (16), either individually or collectively. Promise options (1) through (16) refer to the promise options (1) through (16) shown in FIGS. 5A and 5B.

The promise management system of the present invention downloads customer data, account data, and collection parameters retrieved from the collection system, to the collector's computer when retrieving an account for collections work.

As shown in FIGS. 3A, 3B, 3C, and 3D, all activities on an account are recorded on the promise management action dialog 40 through the group boxes 42, 46, 48, and 50, as explained. The promise management action dialog 40 also includes tabs such as Promise, Correspondence, and History Text. Selection of the Promise tab 44 displays the promise management action dialog. The Promise tab 44 is the promise advisor information group selector, and further displays a detail group of items based upon the type of promise selected by the user.

Detail Group box 42 displays fields including the place of contact of the account holder, the party contacted, the disputed amount, the route to state indicating which queue to route the resulting account to for promise approval or receipt of payment, the hold date, the excuse, and the time for scheduling another call. Each of the foregoing fields is populated by the user based upon information received from the account holder.

Several of the fields included with the detail group box 42, such as Party Contacted 42-1, Place of Contact 42-2, Route to State 42-3, and Excuse 42-4, can be populated through user selection of dropdown lists as shown in FIGS. 4A, 4B, 4C, and 4D, respectively. The options presented on the dropdown lists 42-3 and 42-4 shown in FIGS. 4C and 4D, respectively, are customizable by the system administrator. Also included are fields 42-5, which accepts entry of the disputed amount, 42-6 which accepts entry of the hold date, and 42-7 which is used to enter a call back time.

The promise option advisory tab is shown as the selected tab 44 in the promise management action dialog 40. Selection of the promise option advisory tab 44-1 initiates display of a promise option advisory group box 46, a Promise Type group box 48, and Promise Details group box 50. As explained in detail herein below, the fields displayed within the Promise Details group box 50 vary, depending upon the Promise Type selected in group box 48.

A user, such as a collector, opens the promise option advisory group box 46 by selecting (using, for example, a mouse) the promise option advisory tab 44-1. Preferably before, but at least in response to, selecting the promise option advisory tab 44-1, the promise option advisory module of the present invention is executed.

The promise option advisory group box 46 displays promise option advisory fields including minimum promise amount 46-1, maximum promise date 46-2, delinquent amount 46-3, current amount due 46-4, balance on account 46-5, overlimit amount 46-6, Recommended Promise 1 amount 46-7, and Recommended Promise 1 date 46-8. The promise option advisory fields are populated by the promise management system of the present invention upon display of the promise management action dialog 40 to the user, in accordance with the collection policy or guidelines entered into the collection system (such as CACS® Enterprise) to which the promise management system of the present invention interfaces. The promise option advisory module of the present invention determines the minimum promise amount 46-1 and the maximum promise date 46-2, respectively, consistent with promise options (1) and (2) shown in FIG. 5A. A decision engine coupled to the promise option advisory module of the present invention provides the data populating the Recommended Promise 1 amount 46-7 and the Recommended Promise 1 date 46-8, in accordance with FIGS. 5A and 5B.

To record a promise, the promise management system of the present invention uses the customer data (including the customer relationship information), the account data, and the collection system parameters (including parameters stored in an accounting system) to calculate the promise options—particularly the minimum promise amount 46-1, the maximum promise date 46-2, the recommended promise 1 amount 46-7, and the recommended promise 1 date 46-8, shown as promise option advisory fields in the promise management action dialog 40. These promise options and their respective definitions are shown in FIGS. 5A and 5B. More particularly, promise option (1) of FIGS. 5A and 5B corresponds to field 46-1 of FIGS. 3A-3D, promise option (4) corresponds to field 46-2, promise option (7) corresponds to field 46-7, promise option (8) corresponds to field 46-8, promise option (9) corresponds to field 46-9, promise option (10) corresponds to field 46-10, promise option (11) corresponds to field 46-11, promise option (12) corresponds to field 46-12, promise option (13) corresponds to field 46-13, promise option (14) corresponds to field 46-14, promise option (15) corresponds to field 46-15, and promise option (16) corresponds to field 46-16.

In the promise management system of the present invention, the promise option advisory module presents the promise options as push-buttons 46-1 through 46-16 on the promise option advisory group box 46 displayed upon selection of the promise option advisory tab. This presentation allows collectors to record quickly in the promise detail group box 50 a suggested promise by selecting the push-button instead of manually entering the promise. When the minimum promise amount push-button 46-1 or the recommended promise amount 1 pushbutton 46-7 is selected, the promise option advisory module prefills the selected amount into the corresponding promise amount field 50-1A in the Promise 1 Detail group box 50-1, as shown in FIGS. 3A, 3B, and 3C, or Amount field 50-4A in the Down Payment Information group box 50-4 as shown in FIG. 3D.

In the promise management system of the present invention, the user can override the promise options populated by the promise management system of the system as discussed herein below, by inputting a user-decided value into the corresponding promise option fields shown in FIGS. 3A, 3B, 3C, and 3D.

The Promise Type dialog box 48 provides several options for categorizing promises, including a single promise 48-1, a two part promise 48-2, a long term promise 48-3, and a deferred payment arrangement 48-4. The Promise Details group box displays a variety of different fields in which the promise details are input, depending upon which promise type is selected by the user in the Promise Type dialog box 48.

A single promise option is shown in FIG. 3A. A single promise includes one promise amount 50-1A and one promise date 50-1B, as shown in the Promise Details group box 50-1. If a promise option other than a single promise were to be selected using the Promise Type Group box 48, then promise details corresponding to the promise option selected would be displayed in the Promise Details group box 50.

If the user selects a two-part promise using the Promise Type group box 48, then the user must enter the requested data (including a second promise amount 50-2A and a second promise date 50-2B) in the Promise 2 Detail group box 50-2, as shown in FIG. 3B. The second promise amount 50-2A and the second promise date 50-2B are respectively populated either by the user entering data into each of the foregoing fields, or by selecting the recommended promise amount 2 pushbutton 46-9 and the recommended promise date 2 pushbutton 46-10, which are determined by the promise option advisory module of the present invention consistently with promise options (9) and (10), shown in FIG. 5B.

Likewise, if the user selects a long-term promise using the Promise Type group box 48, then the user must enter the requested data (including long term promise amount 50-3A, frequency 50-3B, and day 50-3C) in the Long Term Promise group box 50-3, as shown in FIG. 3C. More particularly, if a long term promise option were to be selected in the Promise Type Group box 48, in addition to entry of the Promise 1 Details 50-1 (amount 50-1A and date 50-1B) as a down payment, the long term promise amount 50-3A and the options for the frequency of payments 50-3B, such as weekly, bi-weekly, monthly, etc., and long-term promise amount promise day of the month 50-3C (if needed) would be displayed in the Promise Details group box 50-3. The Promise amount 50-3A, the frequency 50-3B, and the day 50-3C are populated either by the user entering data therein, or by the user selecting the Recommended long-term payment amount pushbutton 46-11, the recommended frequency amount pushbutton 46-12, and the recommended day pushbutton 46-13. The values presented by the promise option advisory module of the present invention in fields

46-11, 46-12, and 46-13 are determined as described for promise options (11), (12), and (13), respectively, described with reference to FIG. 5B.

Similarly, if the user selects a Deferred Payment Arrangement using the Promise Type group box 48, then the user must enter the requested data (including payment amount 50-5A, frequency 50-5C, and number of payments 50-5B) in the Deferred Payment Arrangement group box 50-5, as shown in FIG. 3D. The above-mentioned fields 50-5A through 50-5C are populated either by the user entering in the requested data, or by the user selecting the recommended deferred payment arrangement (DPA) pushbutton 46-14, the recommended frequency pushbutton 46-15, and the recommended number of payments pushbutton 46-16, respectively. The values presented by the promise option advisory module of the present invention in fields 46-14, 46-15, and 46-16 are determined as described for promise options (11), (12), and (13), respectively, described with reference to FIG. 5B. The Total amount field 50-5D is a display-only field which displays the total amount due. The total amount due is received by the promise option advisory module of the present invention and is equal to the delinquent amount (received from the collection system or database) minus a disputed amount.

Alternatively, if data is not entered in one of the Payment amount (50-5A), Frequency (50-5C), or # of payments (50-5B) fields, upon selection of the Calculate 50-5E pushbutton, the promise option advisory module of the present invention calculates the missing data using the above-mentioned data (50-5A and 50-5B, 50-5A and 50-5C, or 50-5B and 50-5C) which has been entered, and displays the calculated data to the user in the respective fields.

Most typically, if the promise is non-standard and not one of the promise options recommended by the promise option advisory module, the user would then indicate using the Route to state field 42-3 of dialog box 42 a queue to which the account with promise details is routed. An example of a queue would be a supervisor queue for approval of the user-decided values.

Details of the correspondence tab and the history text tab are not shown in FIGS. 3A, 3B, 3C, or 3D. Briefly, though, the Correspondence tab indicates correspondence available to be sent to the account holder, and the History text tab includes a text entry area to add comments related to the activity.

Also included in the promise management action dialog 40 shown in FIGS. 3A, 3B, 3C, and 3D are buttons 52, such as Submit Action and Get Next, Submit Action, and Cancel. Cancel closes the action dialog 40. Submit Action and Get Next submits the completed promise management action dialog 40 to the collection system for review, action, and recordation on the account, and then retrieves the next account allocated to the current collector. Selection of the Submit Action button has the same function as selection of the Submit Action and Get Next button, but does not retrieve the next account.

Account data in the present invention is now explained in further detail. The promise option advisory module of the present invention uses all available account data, including both customer-level data (such as the above-mentioned relationship-specific information) for the customer and data drawn from multiple accounts of the customer, to recommend a promise option that is in the best interest of the financial institution and the customer and which follows the credit granting institution's current policy as implemented in the promise management system of the present invention. Accordingly, the promise option advisory module of the present invention makes promise recommendations based on all known, available information about the customer.

To determine the promise options for a customer presented to a user, the promise option advisory module of the present invention analyzes the data from the multiple, individual accounts of the customer, then analyzes the relationship-specific information for the customer, to determine an optimal promise payment strategy, which is reflected in the recommended best payment option of the promise options presented to the user for a particular customer.

For each customer, analysis by the promise management system of the present invention, when coupled to a decision engine, includes all or a portion of the following functions, the calculations and determinations for which are performed by the decision engine:

a.) devising strategies to bring all of the multiple, individual accounts up to date over a period of time;

b.) determining which of the multiple, individual accounts should be brought up to date first based on balance or risk of an individual account as compared to other individual accounts;

c.) implementing the credit granting institutions collection strategy (e.g., reduce mortgage delinquency first); and d.) comparing profitability of each of the multiple, individual accounts.

The promise option advisory module of the present invention then performs additional analysis of the account data for a customer based upon customer level data (or relationship-specific data), to recommend the optimal promise payment strategy. The additional analysis based on customer level data includes past and future customer value/profitability, risk of additional delinquency, likelihood of attrition, likelihood of a customer accepting a particular promise scenario, and follow through on previous accepted payment plans.

All of the above-mentioned components of the account data can be weighted and analyzed in accordance with criteria established within the promise management system of the present invention, in accordance with credit policy guidelines of the institution managing the promise management system.

FIGS. 5A and 5B show promise options and their respective list of definitions implemented by the promise option advisory module of the present invention on data from one of the multiple accounts for a customer. The promise options, determined by the promise option advisory module of the present invention for each of the multiple accounts based on the list of definitions, are then compared to each other, across all of the multiple accounts for the customer, and to the relationship-specific information, before promise options are recommended to the user as explained herein above.

FIGS. 5A and 5B refer to the list of definitions included in decision logic. The decision logic considers account parameters, customer data, credit granting institution policy, and other factors in determining the recommended promise arrangements. Typically this logic may differ from implementation to implementation based on a client's customer portfolio, performance, profitability, and the institution's collection strategy. One possible implementation may be to create a risk score (as determined by a scoring model) based on historical account data, comparing the data for similar accounts and each account's likelihood of continued delinquency or write-off. One skilled in the art could create decision logic based on the historical data for the creation of a risk score that would be used to determine promise arrangements. Typically, decision logic changes over time as more sophisticated risk modeling techniques are used, and the demographics for the account base change. It is expected that these new models and techniques would be supported in a system such as the Strata™ Decision Support System (discussed herein below) to continue to support the promise option advisory module decisioning, and support the clients' collection strategies.

Referring now to FIGS. 5A and 5B, the Minimum Promise Amount (1), and the Maximum Promise Date (4) promise options are calculated by the promise option advisory module, the Recommended Promise 1 Amount (7), the Recommended Promise 1 Date (8), the Recommended Promise 2 Amount (9), the Recommended Promise 2 Date (10), the Recommended Long Term Promise Amount (11), the Recommended Long Term Promise Frequency (12), the Recommended Long Term Day (13), the Recommended Deferred Payment Arrangement Amount (14), the Recommended DPA Frequency (15), and the Recommended DPA Number of payments (16) promise options are calculated by a decision engine coupled to the promise option advisory module of the present invention, upon selection by the user of the promise option advisory tab. The foregoing promise options (1), (4), and (7)-(16) are referred to as calculated promise options. The Recommended Promise 1 Amount (7) and the Recommended Promise 1 Date (8) (and, variously, if applicable as shown in FIGS. 3A-3D, promise options (9) through (16) of FIGS. 5A and 5B) are referred to as a recommended best payment option, and, together form an optimal promise.

The rest of the promise options (2), (3), (5), and (6) shown in FIGS. 5A and 5B are received by the promise management system of the present invention from a collection system interfaced thereto, such as, for example, the CACS® Enterprise collection system, or are stored in a data base included in or interfaced to the promise management system of the present invention. Although values, or calculations, are provided for the Minimum Promise Amount, preferably these calculations are modifiable by the systems administrator.

Figure 6:
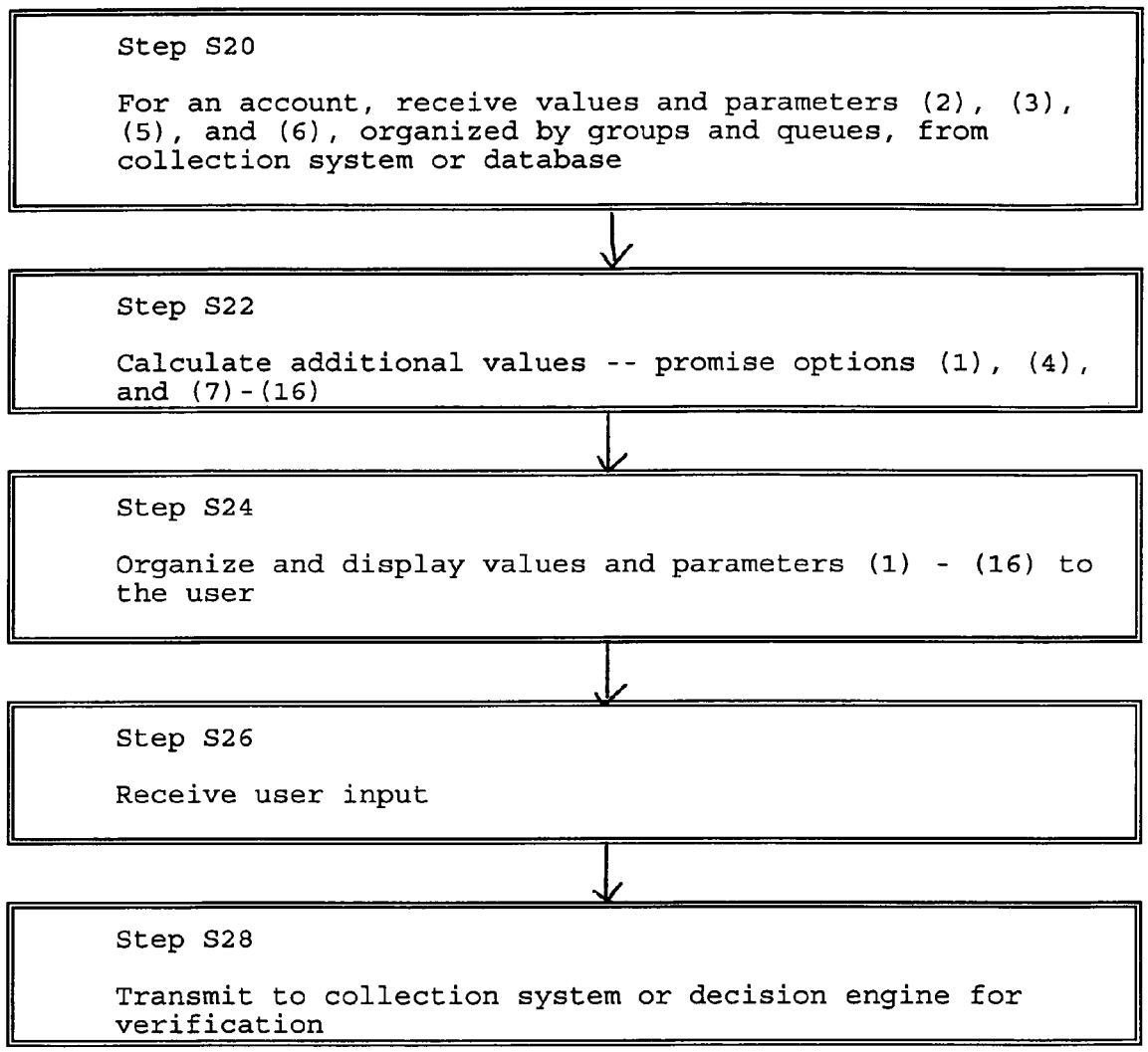
FIG. 6 is a flowchart 54 of the functions executed for each account by the promise option advisory module of the present invention.

FIG. 6 is a flowchart 54 of the functions executed for each account by the promise option advisory module of the present invention. In FIG. 6, reference is made to values (1) through (16), corresponding to the promise options shown in FIGS. 5A and 5B. Not all of the promise options (1) through (16) are applicable to each user, and which of the promise options (1) through (16) are calculated depends upon which of the promise types 48-1 through 48-4 are selected, as shown in FIGS. 3A through 3D.

As shown in FIG. 6, in operation S20, the promise option advisory module receives values and parameters (2), (3), (5), and (6), shown in FIGS. 5A and 5B, organized by groups and queues, from the collection system or database. Then, in operation S22, the promise option advisory module calculates additional values (1) and (4), and the decision engine calculates additional values (7)-(16), depending upon which are applicable, in accordance with FIGS. 5A and 5B. The promise option advisory module then organizes and displays values and parameters (1)-(16) to the user, in operation S24.

The user then negotiates with the account holder, based upon the values and parameters (1)-(16), shown in FIGS. 5A and 5B, and displayed to the user.

The user may override some of the suggested values, most notably the minimum promise amount (1), the maximum promise date (4), the Recommended Promise Amount 1 (7), the Recommended Promise Date 1 (8), the Recommended Promise 2 Amount (9), the Recommended Promise 2 Date (10), the Recommended Long Term Promise Amount (11), the Recommended Long Term Promise Frequency (12), the Recommended Long Term Day (13), the Recommended Deferred Payment Arrangement Amount (14), the Recommended DPA Frequency (15), and the Recommended DPA Number of payments (16) by inputting values other than the recommended payment option values into the group box 50. The user may also change details about the action input in group box 42, such as the party contacted, the place of contact, the queue to which the account should be routed for approval before submission to the collection system, etc.

Whether the recommended payment option values or other values are input into the group box 50, in operation S26, the promise option advisory module of the present invention routes input values entered by the user in group boxes 42 and 50 on the promise management action dialog 40 as indicated by the value entered in field 42-3.

In operation S28, the account is then returned to the collection system, or is transmitted to a decision engine, for verification, to determine whether the promise details (minimum promise amount and the maximum promise date) meet the requirements of the collection guidelines stored in the collection system 20 or the decision engine.

FIG. 7 is a flowchart 56 of a collection cycle, including a payment promise, in which the promise management system of the present invention is used. In the flowchart 56 of FIG. 7, operations S30, S32, S38, S40, and S42 correspond, respectively, to operations S10, S12, S14, S16, and S18 of the collection cycle of the prior art, shown in FIG. 1, the explanation of which is not repeated herein. The collection system 20 shown in FIG. 7 is the same as the prior art collection system shown in FIG. 1.

However, in the flowchart 56 of FIG. 7, operations S34 and S36 are added using the promise management system of the present invention. In operation S34, the promise option advisory module of the present invention, included in the promise management system, calculates and presents to the user using the promise management action dialog 40 described herein above, promise options (1)-(16) in accordance with FIGS. 3A through 3D and FIGS. 5A and 5B herein above. Then, in operation S36, the account is presented to the user (such as the collector) with payment options, by the promise management system of the present invention. Therefore, before the collector negotiates with the account particularly with calculated promise options (1) and (4) generated by the promise option advisory module and calculated promise options (7)-(16) generated by the decision engine coupled to the promise option advisory module and input thereto, that are within the collection policy guidelines of the collection system. Therefore, the promise options (1), (4), and (7)-(16) are verified by the collection system if submitted to the collection system for such verification in operation S42.

FIGS. 8A and 8B are explained in conjunction with each other, and show examples of a computer system 60 (FIG. 8A) and computer system software 61 (FIG. 8B) in which the promise option advisory module of the present invention is included. It will be apparent to one of ordinary skill in the art that the computer system and computer system software shown in FIGS. 8A and 8B, respectively, are examples of systems in which the present invention is included, and the present invention may be included in various other systems, having differing architectures, not shown in FIGS. 8A and 8B.

FIG. 8A is a hardware diagram of a computer system 60 on which the promise option advisory module of the present invention included in the promise management system is executed.

FIG. 8B is a software diagram of computer system software 61 including the promise option advisory module 62 in the promise management system of the present invention.

As shown in FIG. 8A, data is passed between all of the components of the computer system 60 using, preferably, XML data transport 63.

Referring now to FIGS. 8A and 8B, a mainframe computer 64 running CICS™ 61 executes a collection system such as CACS® Enterprise 66, which interfaces to a database (not separately shown in FIGS. 8A and 8B) included in the mainframe computer 64. The database stores, for example, the account data entered or approved by the collector on the promise management action dialog 40. The mainframe computer 64 is preferably a Mainframe Enterprise Server, executing MVS/ESA™ or OS/390™. CICS™, MVS/ESA™, and OS/390™ are well-known in the art.

When a collector requests an account, the collection system, such as CACS® Enterprise 66, accesses the database, and passes through a CACS® API (application program interface) 66-1 as a CACS® Business Request the data read therefrom to a middleware server 70 in an XML data stream, using an LU 6.2 interface. The middleware server 70, which is typically executing UNIX™ or NT™, manages the communication session between the client PCs 75 and the mainframe 64, using infrastructure software components, such as Active Works™ CICS™ Adapter 71-2 and Active Works Information Broker™ 71-1, then passes the formatted data as ActiveWorks Events™ over a TCP/IP connection, either to a network user on a client PC 75 or to an extranet user on a client PC 75 executing WINDOWS™ or NT™. WINDOWS™, NT™, and TCP/IP are well-known in the art.

If the formatted data is passed to the extranet user, the path is through firewall 77, over another TCP/IP connection to the internet or a private network 73, and over an additional TCP/IP connection to the PC 75. Firewall 77 is preferably executing NT™, AIX™, or Solaris™. AIX™, NT™, and Solaris™ are well-known in the art.

When the formatted data reaches the client PC 75, then the formatted data is presented to the promise option advisory module 62 as part of the promise management system executed by the PC 75 as a CACS® GUI Java™ Application 79-1. Interfaces between the CACS® GUI Java™ Application 79-1 and the middleware application server 70 include Java™ Communication classes module 79-4, Open Dialer Access Classes™ 79-3, and Autodialer Application™ module 79-2, all executed by the PC 75 and all well-known in the art.

The promise management system 62, which preferably is software being executed by a client PC 75 executing WINDOWS™ or NT™, displays the formatted data to the user using the promise management action dialog 40 discussed herein above, in accordance with the flowchart 54 shown in FIG. 6. The client PC stores the promise management system, including the promise option advisory module 62, on a storage medium included therein, such as hard disk drive.

FIG. 9 is a hardware architecture diagram of a network 74 including client personal computers 75 executing promise option advisory module software 62 of the present invention. The configuration of the network 74 shown in FIG. 9 is customizable from client to client, and the particular configuration shown in FIG. 9 is not required for successful operation of the promise option advisory module of the present invention.

As shown in FIG. 9, a collection system 66 is executed by a mainframe computer 64, including a database 68 storing data extracted from an account and reference data such as control tables. The mainframe computer 64 is coupled to a middleware server 70-1, including a message broker/application server. The message broker/application server 70-1 passes the data, but may store business rules, data edits and conversions, and legacy integration information. The message broker/application server is coupled to a Firewall 77-1, to PCs 75 through a local area network (LAN) or wide area network (WAN) connection, and to PCs 75 through System Network Architecture™ (SNA™) connections.

The users of the PCs 75-1 coupled to the computer 64 through the SNA™ connection are internal collectors using CACS® Enterprise 3270. The users of the PCs 75-2 coupled to the middleware server 70-1 through the LAN/WAN connection are internal collectors using application software in which the promise option advisory module 62 of the present invention is included, referred to as CACS® Anywhere.

Through a Firewall 77-1, the middleware server 70-1 is coupled over a TCP/IP connection through the internet or a private network 73-1 to PCs 75-3 used by External Collectors/Agents using application software in which the promise option advisory module 62 of the present invention is included (CACS® Anywhere).

Also through Firewall 77-1, the middleware server 70-1 is coupled to web server 70-2. Then, over TCP/IP connection through Firewall 77-2 and the internet or a private network 73-2, the web server 70-2 is coupled to PCs 75-4 used by customers accessing a company website on the worldwide web.

The mainframe computers 64, the middleware servers 70, and the network 73 are known in the art.

FIG. 10 is a data flow diagram showing data flow in a preferred architecture of a computer system 76 implementing the promise option advisory module 62 of the present invention. FIG. 11 is a flowchart 82, related to, and explaining, the data flow diagram of FIG. 10.

FIGS. 10 and 11 are explained jointly in the following paragraphs, and in the following explanations of FIGS. 10 and 11, encircled numerals indicate data explained in FIG. 11 being passed between the promise option advisory module 62, Decision Engine 78, the database 68, the collection system 66, and the company web site 80, in the direction(s) shown in FIG. 10.

Promise option advisory module access is established through a user interface 80, preferably a GUI interface. The promise are referred to as utility components of the promise management system of the present invention. The collection system 66 interfaces to the promise option advisory module 62 by a mainframe access, by internet access through a company website, or through a LAN (local area network) internal access.

As shown in FIG. 10, the promise option advisory module 62 is a standalone utility function, and is software executed by, for example, a personal computer. Data is passed between the promise option advisory module 62 and the decision engine 78, the user interface 80, the collection system 66, and the database 68 using, for example, a well-defined application program interface (API).

As shown in FIGS. 10 and 11, a user in operation S50 through a user interface 80 requests promise options from the promise option advisory module 62 of the present invention. Next, in operation S52, the promise option advisory module 62 accesses account data and promise options (for example, promise options (2), (3), (5) and (6) shown in FIGS. 5A and 5B) stored, preferably, in the database 68 included in a database server (not shown in FIG. 10) or in collection system 66. The database 68 is populated with the account data and the promise options downloaded from the collection system 66 to the database 68. Optionally, database 68 could be part of an additional computer system.

The account data and promise options, which are predetermined by the collection system 66, are returned to the promise option advisory module 62, as shown in operation S54. In operation S56, the promise option advisory module requests the decision engine 78 (explained in further detail herein below) calculate promise options (particularly promise options (7)-(16) shown in FIGS. 5A and 5B, but also promise options (1) and (4) shown in FIGS. 5A and 5B, if needed). Otherwise, the promise option advisory module 62 calculates the promise options (1) and (4), and the decision engine calculates promise options (7)-(16) in accordance with the above-mentioned description.

If the promise option advisory module 62 requests that the decision engine 78 calculate the promise options in operation S56, the decision engine 78 returns the calculated promise options to the promise option advisory module 62, in operation S58. If the promise option advisory module 62 does not request that the decision engine 78 calculate the promise options in operation S56, then the promise option advisory module 62 calculates the promise options in accordance with the above-mentioned FIGS. 5A and 5B, and control proceeds directly to operation S60.

In operation S60, the calculated promise options are returned to the user for presentment and selection. Next, in operation S62, the promise option or other arrangements agreed to by the user are transmitted to the promise option advisory module 62. The promise option advisory module then determines whether the decision engine 78 should be called to validate or approve the promise agreed upon. If the promise option advisory module 62 determines that the decision engine 78 should not be called, such as in the case that the calculated promise options are selected by the user, then control passes to operation S72, which is explained herein below.

On the other hand, if the promise option advisory module 62 determines that the decision engine 78 should be called, then the promise option/data is passed to the decision engine 78 for acceptability and tolerance checking, in operation S66.

In operation S68, the validation results are returned to the promise option advisory module 62. If the validation results contain errors, the errors are returned to the user in operation S70.

If the validation results do not contain errors in operation S68, or, if in operation S64 the promise option advisory module 62 does not send the promise option or arrangement to the decision engine for validation, then, in operation S72, an accepted message is sent to the user via the user interface 80, the customer's account is updated, preferably, in the database 68 or in the collection system 66, and the promise data is recorded for strategy evaluation and tuning in database 68. The customer's account data is transmitted between the collection system 66 and the database 68, as shown in FIG. 10, to reconcile the data stored in the collection system 66 and the database 68.

The operation of the system 76 shown in FIG. 10 varies slightly from the previous description of a system implementing the promise option advisory module 62. In the system 76 shown in FIG. 10, the decision engine 78 validates the promise options before the promise options are sent to the collection system 66. Validation of the promise options by the decision engine 78 ensures that the promise options transmitted to the collection system 66 will be accepted by the collection system 66, thus reducing even further the amount of time required to record a valid promise in the collection system 66.

The decision engine 78 is now briefly explained. Decision engines, generally, are well-known in the art. The decision engine 78 implements a rules based decision management system, which is a computer implemented system applying strategies to determine actions to be taken, monitoring performance based on the taken actions, and providing a manner to refine the strategies in accordance with the monitored performance. An example of a decision engine 78 is discussed in the above-mentioned DECISION MANAGEMENT SYSTEM WHICH IS CROSS-FUNCTION, CROSS-INDUSTRY AND CROSS-PLATFORM. For example, the AMS Strata® decision support system is a software based system which applies predictive modeling techniques to customer data, to thereby generate dramatic improvements in the effectiveness and profitability of customer interactions, as discussed in the above-mentioned DECISION MANAGEMENT SYSTEM FOR CREATING STRATEGIES TO CONTROL MOVEMENT OF CLIENTS ACROSS CATEGORIES. The AMS Strata® decision support system release 2.0 was released in 1993, and release 3 is currently available.

The promise option advisory module 62 can also be used, in conjunction with the decision engine 78, the database 68, and the collection system 66, to determine test and control groups strategy, to provide examples of acceptable promise options which are not necessarily in accordance with the promise options as defined in the above-mentioned FIGS. 5A and 5B. The decision engine 78, for example, could also be used to provide effectiveness reporting of promise options, by providing acceptance results in finer gradations of categories, by stratifying the acceptance results across measures of customer segments and test groups, instead of at the enterprise level as is the current state of the art.

Various flow charts are used herein to describe the operation of the present invention. These flow charts illustrate examples of the present invention, and it should be understood that these flow charts can easily be modified to illustrated changes which are encompassed by the embodiments of the present invention. For example, in the flow charts, operations can be performed in a different order, and many of the operations can be eliminated or added to various embodiments of the present invention. Such changes should be considered to be within the spirit and scope of the present invention.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method implemented by a computer system comprising:
   receiving, from a database, values and parameters comprising data from multiple accounts of a customer and relationship-specific information for the customer;
   calculating, by a computer-based promise option advisory module, optimal and minimal promise to pay options for each of the multiple accounts needing collection, based upon the received values and parameters, wherein the calculated promise to pay options comprise at least one of a single promise, a long-term promise, and a deferred payment arrangement, and the calculated optimal promise to pay option comprises a recommended promise amount and a recommended promise date;

displaying, by the computer-based promise option advisory module, the calculated optimal and minimal promise to pay options to a collector whose job is to collect payments or debts, prior to the collector interacting with the customer; and after the collector interacts with the customer to obtain agreement with the customer to a respective displayed promise to pay option and the collector thereafter selects the displayed promise to pay option which was agreed to with the customer, receiving, by the computer-based promise option advisory module, the selected promise to pay option.

2. The method as recited in claim 1, further comprising:

validating by a computer-executed collection system, the selected promise to pay option; and updating the database based upon the selected promise to pay option if the selected promise to pay option is within collection policy guidelines, otherwise returning an error message to the promise option advisory module.

3. The method as in claim 1, wherein at least one of the accounts of the multiple accounts needing collection action is a delinquent account.

4. The method as in claim 1, wherein at least one of the accounts of the multiple accounts needing collection action is an overlimit account.

5. The method as recited in claim 1, further comprising:

calculating, by a decision system, the promise to pay options; and recording the promise to pay options in a collection system.

6. A method as recited in claim 1, wherein the calculated and displayed promise to pay options include a single promise, a long-term promise and a deferred payment arrangement.

7. A computer-implemented method comprising:

receiving, from a database, data from multiple accounts of a customer and relationship-specific information for the customer;

calculating, by a computer, optimal and minimal promise to pay options for a respective account of the multiple accounts needing collection, based upon the received data from the multiple accounts and the received relationship-specific information for the customer, wherein the calculated promise to pay options comprise at least one of a single promise, a long-term promise, and a deferred payment arrangement, and the optimal promise to pay option comprises a recommended promise amount and a recommended promise date;

displaying, by a computer, the calculated optimal and minimal promise to pay options to a collector whose job is to collect payments or debts, prior to the collector negotiating with the customer; and, after the collector negotiates with the customer to obtain agreement with the customer to a respective displayed promise to pay option and the collector thereafter selects the displayed promise to pay option which was agreed to with the customer, receiving, by a computer, the selected promise to pay option.

8. A method as recited in claim 7, wherein the calculated and displayed promise to pay options include a single promise, a long-term promise and a deferred payment arrangement.

9. An apparatus comprising:

means for receiving, from a database, data from multiple accounts of a customer and relationship-specific information for the customer;

means for calculating, by a computer, optimal and minimal promise to pay options for a respective account of the multiple accounts needing collection, based upon the received data from the multiple accounts and the received relationship-specific information for the customer, wherein the calculated promise to pay options comprise at least one of a single promise, a long-term promise, and a deferred payment arrangement, and the optimal promise to pay option comprises a recommended promise amount and a recommended promise date;

means for displaying, by a computer, the calculated optimal and minimal promise to pay options to a collector whose job is to collect payments or debts, prior to the collector negotiating with the customer; and, means, after the collector negotiates with the customer to obtain agreement with the customer to a respective displayed promise to pay option and the collector thereafter selects the displayed promise to pay option which was agreed to with the customer, for receiving, by a computer, the selected promise to pay option.

10. An apparatus as recited in claim 9, wherein the calculated and displayed promise to pay options include a single promise, a long-term promise and a deferred payment arrangement.

11. An apparatus for determining loan payoff terms, the apparatus comprising:

a database containing multiple accounts of a customer, the database capable of retrieving relationship-specific information for the customer a promissory note determination module, the promissory note determination module in response to the relationship-specific information for the customer retrieved from the database, calculates optimal and minimal promise to pay options for a respective account of the multiple accounts needing collection, the calculated promise to pay options comprise at least one of a single promise, a long-term promise, and a deferred payment arrangement, the optimal promise to pay option comprises a recommended promise amount and a recommended promise date;

a display for displaying the calculated optimal and minimal promise to pay options to a collector whose job is to collect payments or debts, prior to the collector negotiating with the customer; and an input device for inputting the selected promise to pay option, indicated by a customer, after the collector negotiates with the customer to obtain agreement.

* * * * *

UNITED STATES PATENT AND TRADEMARK OFFICE
CERTIFICATE OF CORRECTION

PATENT NO. : 7,318,046 B1
APPLICATION NO. : 09/356048
DATED : January 8, 2008
INVENTOR(S) : Randall S. Wellons It is certified that error appears in the above-identified patent and that said Letters Patent is hereby corrected as shown below:

Col. 14, line 43, after "account" insert --holder, the collector is proactively provided with promise options,--.

Col. 16, line 49, before "are" insert --option advisory module 62, the decision engine 78, and the database 68--.

Signed and Sealed this

Third Day of June, 2008

JON W. DUDAS
*Director of the United States Patent and Trademark Office*